Jan. 22, 1952     L. MASLOW     2,583,513
PORTABLE MARKETING TRUCK
Filed Aug. 10, 1949     3 Sheets-Sheet 1
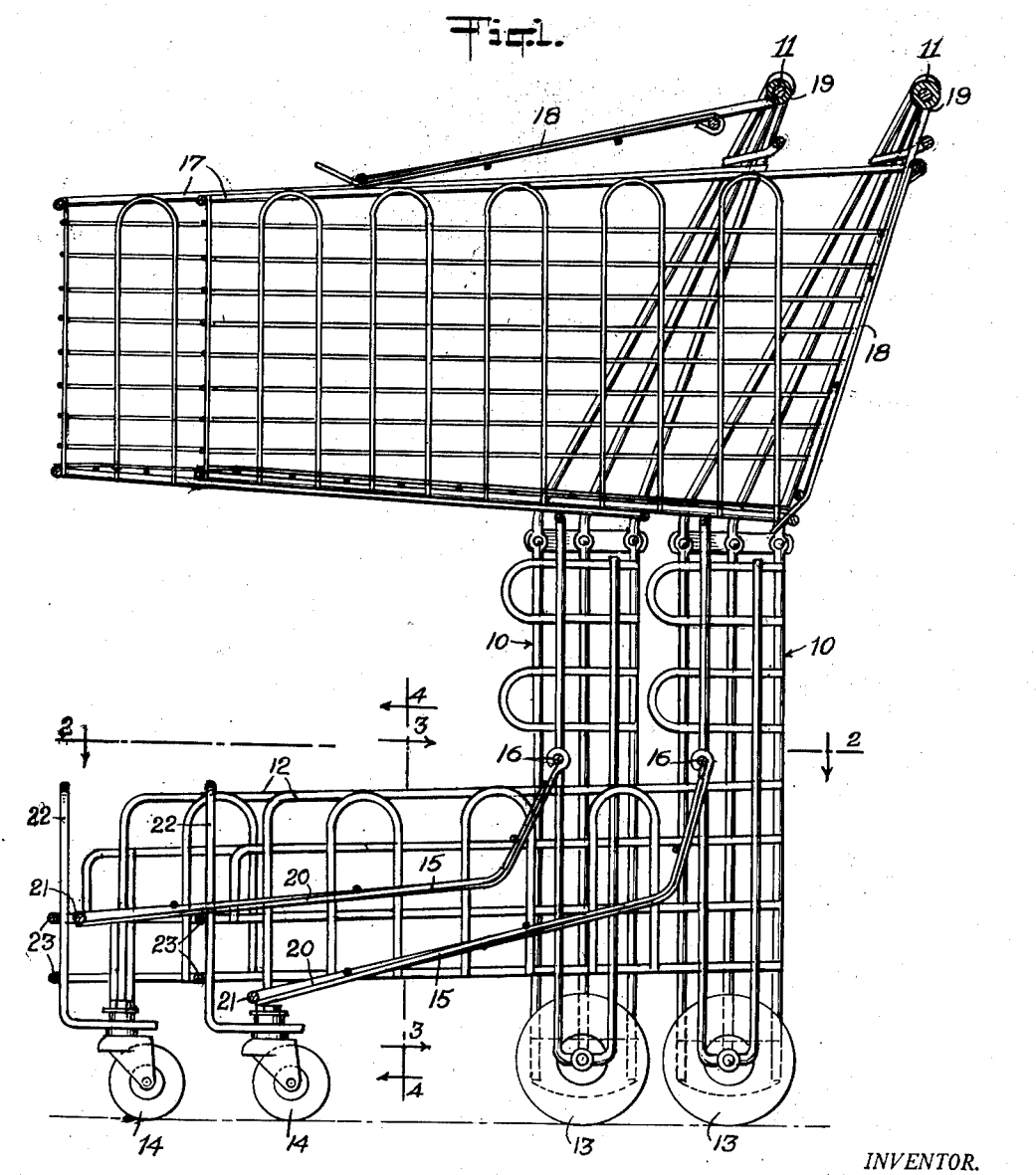
INVENTOR.
Louis Maslow
BY
Munn, Liddy & Glaccum
Attorneys Jan. 22, 1952     L. MASLOW     2,583,513
PORTABLE MARKETING TRUCK
Filed Aug. 10, 1949     3 Sheets-Sheet 2
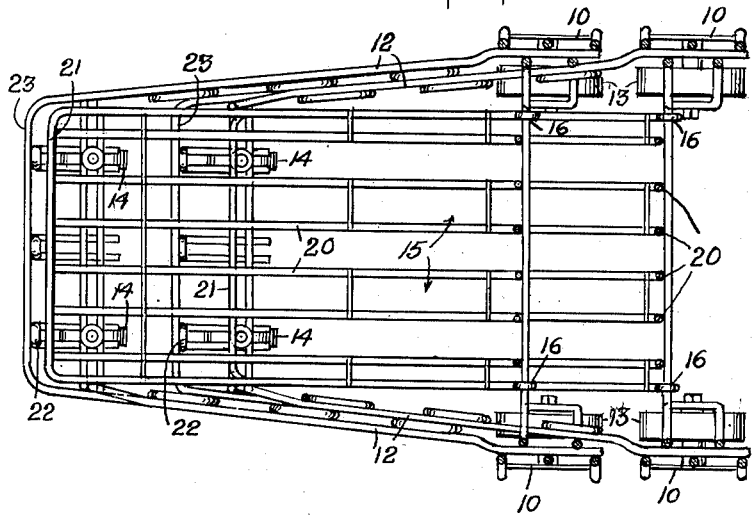
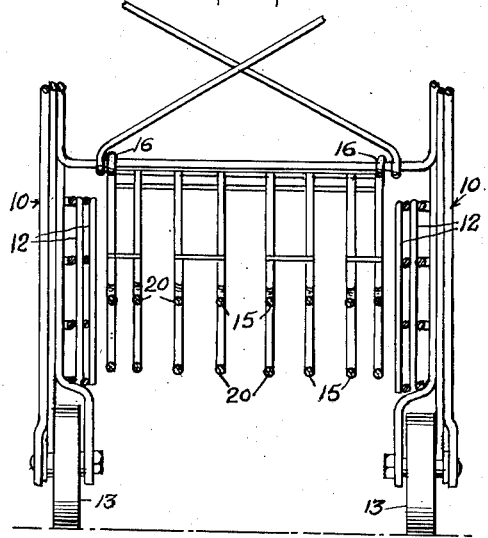
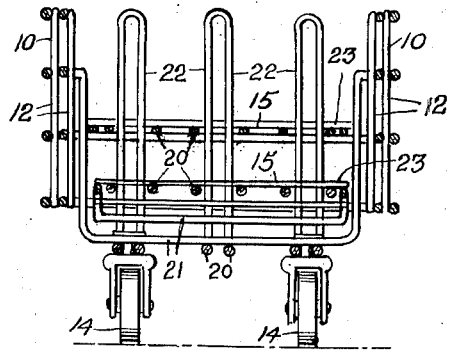
INVENTOR.
Louis Maslow
BY
Munn, Liddy & Glaccum
Attorneys

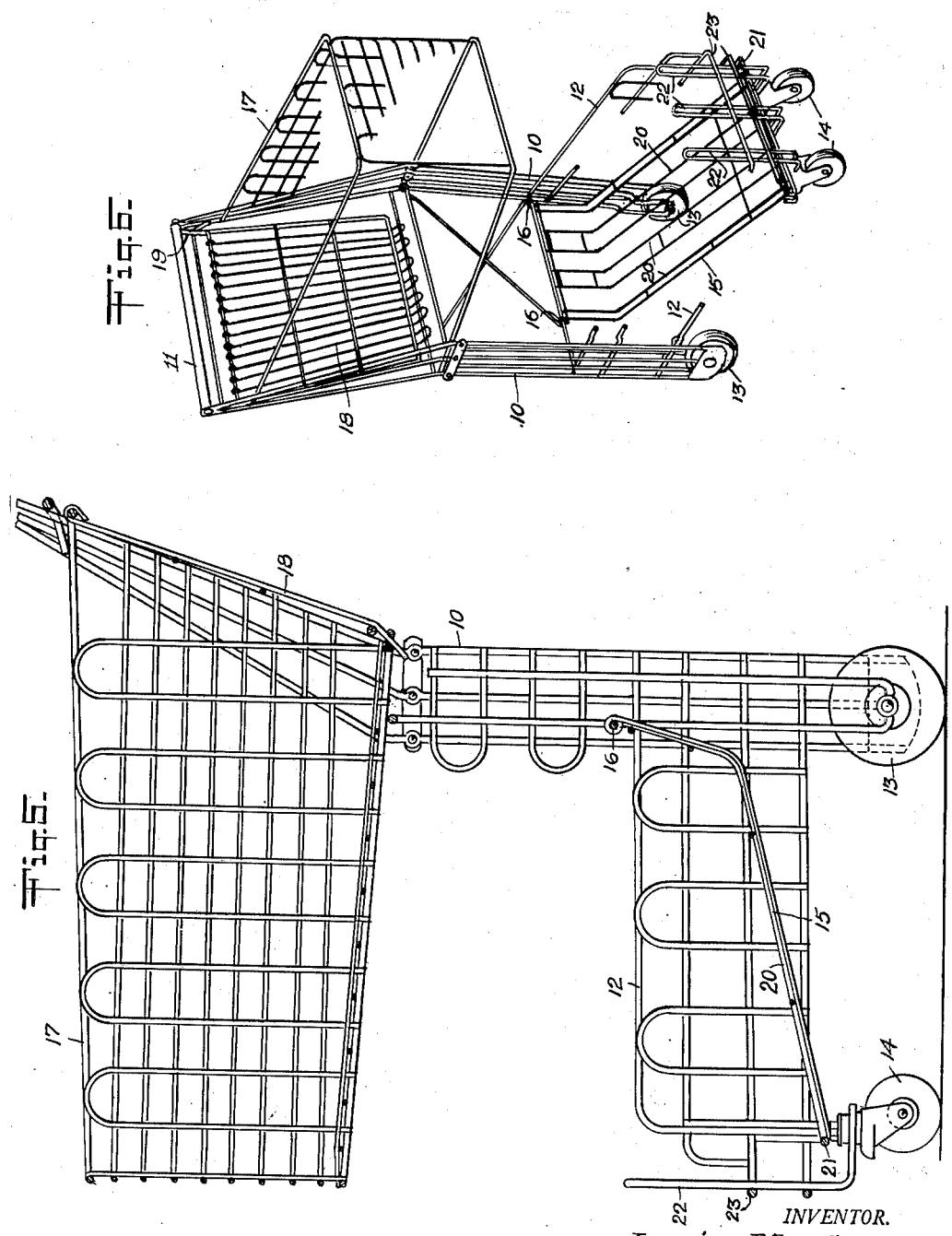

Patented Jan. 22, 1952

2,583,513

UNITED STATES PATENT OFFICE 2,583,513

PORTABLE MARKETING TRUCK

Louis Maslow, Scarsdale, N. Y.

Application August 10, 1949, Serial No. 109,463

4 Claims. (Cl. 280—50)

This invention relates to new and useful improvements in marketing trucks and especially to those of the general type which are used by housewives in chain stores, to move around from place to place in selecting various merchandise which is to be brought to the front of the store to be inspected and listed by the usual checker therein.

An object of the invention is to produce a strong, durable, light-weight truck, which can be easily moved by the user and at night can be snugly nested relative to other similar trucks, so that when so nested, they take up a minimum of floor space.

A further object is to provide a construction of truck which can be nested with respect to another by merely shoving it into this relation, and which can be as easily removed from this relation by merely pulling it out of nesting relation.

Further and more specific objects, features, and advantages will more clearly appear from a consideration of the detailed specification hereinafter set forth especially when taken in connection with the accompanying drawings which illustrate a present preferred form which the invention may assume and which form part of the specification.

In brief and general terms, the invention concerns a truck which has a base frame on rollers and at the rear, a vertical frame from which forwardly extend upper and lower baskets to receive merchandise therein. The compartments or baskets are provided with pivoted walls which are adapted to be pivoted out of normal position when another truck is shoved into nesting position, so that the baskets or compartments of one truck may partly at least be disposed in nesting relation to those of the other truck with which it is being nestingly related, thus permitting the two or more trucks to occupy, when not in use, much less floor space that they would if disposed on the floor entirely separate.

More particularly, the upper basket has a pivoted rear wall which is adapted to be swung up by contact with the front wall of another basket which is being nested therewith. The lower compartment or basket is provided with a bottom wall which is pivoted also, so that when the bottom basket of another truck is projected into nesting relation, the front wall of the lower basket of the projected truck will engage the bottom wall thus pivoted, and swing it up out of the way so that the two baskets may be suitably nested.

In order to reduce the weight, the preferred forms of the trucks shown, are made of wire but it is to be understood that they may be made of metal or other suitable material, either solid or only partly so, as may be desired under given circumstances.

The present preferred form which the invention may assume is illustrated in the drawings, of which:

Fig. 1 is a side elevation of two trucks nested together;

Fig. 2 is a horizontal section taken on the line 2—2 of Fig. 1;

Fig. 3 is a vertical section taken on the line 3—3 of Fig. 1;

Fig. 4 is a vertical section taken on the line 4—4 of Fig. 1;

Fig. 5 is a side elevation of a single truck; and,

Fig. 6 is a perspective view, partly broken away, of a truck constructed in accordance with this invention.

In the preferred form of the invention shown herein, the truck is formed mainly of wire rods although it is to be understood that it may be made in other forms, and of other material if desired. The truck comprises a rear vertical frame denoted generally by the numeral 10, at the top of which is disposed a handle 11.

At the bottom of the vertical frame 10, is disposed a forwardly disposed lower compartment generally designated by the numeral 12. To the bottom of the frame 10 are attached rollers 13 and to the bottom front of the compartment 12, are conneced rollers 14. The lower compartment 12 is provided with a bottom wall 15, which is pivoted at 16 and sloped forwardly and downwardly from the pivot point in the normal position of it.

At the top of the frame 10, there forwardly projects an upper compartment or basket 17, the rear wall 18 of which is pivoted at its top 19 so that when the front portion of a similar compartment is projected into it, the wall will be swung up out of the way to permit the nesting of the two baskets to a substantial degree.

With reference to the bottom wall of the lower compartment or basket 12, it will be noticed that it is hung from the rear top edges and slopes forwardly and downwardly and therefore, when the front wall of a similar basket of another truck is projected into it, this bottom wall will be swung up substantially out of the way to permit the two lower baskets to be nested as desired.

Since each truck with its parts and upper and lower baskets, is designed exactly like the other trucks to be used in the same store, it will be seen that at night when the employees desire to store the trucks in a minimum of space, they merely have to take a truck and shove its front end into nesting relation with that of another and thus may line up in nested relation any large or desired number of trucks, so that they can be stowed away in a minimum of space and when desired for use, it is merely necessary to pull out the last truck of the row and then the next and so on.

With more particular reference to the actual construction of the preferred form shown in the drawings, it is to be noted that the rear wall 18 of the upper basket is pivoted at 19 on an axis, as shown in Figure 1, well above the top of the basket so that when the front of another basket is projected thereinto, the rear wall 18 is thus swung up well out of the way of the projected basket, as shown clearly in Figure 1.

With respect to the detailed construction of the lower basket, it is to be noted that the bottom wall is formed of spaced longitudinally extending wires or rods 20 connected at their front ends by a cross rod 21. The front wall of the lower basket 12 is formed of spaced upright pairs of wires or rods 22, braced at their intermediate height by a cross bar or rod 23. These upright rods 22 are disposed in line with the spaces between the wires or rods 20 of the bottom wall previously mentioned, so that as the lower basket of one truck is projected toward the lower basket of another truck, these upright rods 22 will extend into the spaces between the rods 20 and the cross rod 23 will encounter the longitudinal rods or wires 20 and thus tend to lift the bottom wall 15 to the position shown in Figure 1.

Thus we have two baskets with a maximum of normal space to receive goods and which when two trucks are nested, will permit the closest possible nesting so that the nested trucks will occupy the least floor space possible.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

What I claim as my invention, is:

1. A merchandising truck which comprises a frame, a lower basket projecting forwardly from said frame, a bottom wall of said basket formed of spaced elements pivoted at their rear upper ends to the frame, upright elements at the front of the basket and spaced apart and in alignment with the spaces between said bottom wall elements, and a cross rod connecting said upright elements.

2. A merchandising truck which comprises a vertical frame and a horizontal base portion supporting said frame, rollers on said base portion, a lower basket resting on said base portion, a bottom wall on said basket, said wall pivoted at the top rear of said basket on a horizontal axis and sloping downwardly and forwardly to the front of the basket, said bottom wall formed of spaced longitudinal elements, a series of upright elements spaced apart at the front of the basket and in line with the spaces between the longitudinally extending elements of the bottom wall, and a horizontal element extending across said upright elements intermediate their height and connecting them.

3. A merchandising truck which comprises a vertical frame and a horizontal base portion supporting said frame, rollers on said base portion, a lower basket resting on said base portion, a bottom wall on said basket, said wall pivoted at the top rear of said basket on a horizontal axis and sloping downwardly and forwardly to the front of the lower basket, said bottom wall formed of spaced longitudinal elements, a series of upright elements spaced apart at the front of the basket and in line with the spaces between the longitudinally extending elements of the bottom wall, a horizontal element extending across said upright elements intermediate their height and connecting them, an upper basket supported by and extending forward from said frame, a rear wall on said upper basket and pivoted along a horizontal axis above the normal level of the top of the basket.

4. A merchandising truck which comprises a vertical frame and a horizontal base portion supporting said frame, rollers on said base portion, a lower basket resting on said base portion, a bottom wall on said basket, said wall pivoted at the top rear of said basket on a horizontal axis and sloping downwardly and forwardly to the front of the lower basket, said bottom wall formed of spaced longitudinal elements, a series of upright elements spaced apart at the front of the basket and in line with the spaces between the longitudinally extending elements of the bottom wall, a horizontal element extending across said upright elements intermediate their height and connecting them, an upper basket supported by and extending forward from said frame, a rear wall on said upper basket and pivoted along a horizontal axis above the normal level of the top of the basket, a horizontal handle at the upper end of the vertical frame, the axis of the handle and the pivot axis of the rear wall of the upper basket being coincidental.

LOUIS MASLOW.

REFERENCES CITED

The following references are of record in the file of this patent:

UNITED STATES PATENTS

| Number | Name | Date |
| --- | --- | --- |
| D. 156,702 | Concklin | Jan. 3, 1950 |
| 2,475,797 | Martin | July 12, 1949 |
| 2,479,530 | Watson | Aug. 16, 1949 |